(12) United States Patent
Miller et al.

(10) Patent No.: US 12,313,189 B2
(45) Date of Patent: May 27, 2025

(54) CONDUIT ANCHOR

(71) Applicant: ORBITAL MARINE POWER LIMITED, Orkney (GB)

(72) Inventors: Calum Miller, Orkney (GB); Mark Byers, Orkney (GB)

(73) Assignee: ORBITAL MARINE POWER LIMITED, Kirkwall (GB)

( * ) Notice: Subject to any disclaimer, the term of this patent is extended or adjusted under 35 U.S.C. 154(b) by 99 days.

(21) Appl. No.: 17/759,049

(22) PCT Filed: Dec. 14, 2020

(86) PCT No.: PCT/GB2020/053207
§ 371 (c)(1),
(2) Date: Jul. 19, 2022

(87) PCT Pub. No.: WO2021/148765
PCT Pub. Date: Jul. 29, 2021

(65) Prior Publication Data
US 2023/0039550 A1    Feb. 9, 2023

(30) Foreign Application Priority Data

Jan. 22, 2020 (GB) .................................. 2000956

(51) Int. Cl.
*F16L 1/14* (2006.01)
*B63B 21/20* (2006.01)
(Continued)

(52) U.S. Cl.
CPC ............ *F16L 1/201* (2013.01); *B63B 21/20* (2013.01); *B63B 21/26* (2013.01); *B63B 21/50* (2013.01);
(Continued)

(58) Field of Classification Search
CPC ........ F16L 1/14; F16L 1/12; F16L 1/20; F16L 57/02; E21B 17/017; E21B 17/01
See application file for complete search history.

(56) References Cited

U.S. PATENT DOCUMENTS

| 4,065,822 A | 1/1978 | Wilbourn |
| 4,342,519 A | 8/1982 | Botrel et al. |

(Continued)

FOREIGN PATENT DOCUMENTS

| CN | 101158422 A | 4/2008 |
| FR | 2826051 A1 | 12/2002 |

(Continued)

OTHER PUBLICATIONS

UK Examination and Search Report for application No. GB2000956.9, dated Dec. 20, 2021.

(Continued)

*Primary Examiner* — Sean D Andrish
(74) *Attorney, Agent, or Firm* — MOSER TABOADA

(57) ABSTRACT

Disclosed is conduit anchor, an offshore system comprising a conduit anchor and a method of deployment. The conduit anchor includes a base section adapted for attachment to a conduit, and a conduit guide extending from the base section. In use a dynamic conduit extends along a dynamic conduit pathway range defined by the anchor, via the conduit guide. The conduit guide comprises a convex bend protecting surface region oriented towards the dynamic conduit pathway range which in use protects against over bending of the dynamic conduit.

20 Claims, 5 Drawing Sheets

(51) Int. Cl.
  *B63B 21/26* (2006.01)
  *B63B 21/50* (2006.01)
  *E21B 17/01* (2006.01)
  *F16L 1/20* (2006.01)
  *F16L 57/02* (2006.01)
  *E21B 19/00* (2006.01)
  *F03B 17/06* (2006.01)

(52) U.S. Cl.
  CPC .............. *E21B 17/017* (2013.01); *F16L 1/14* (2013.01); *F16L 57/02* (2013.01); *E21B 19/002* (2013.01); *F03B 17/06* (2013.01)

(56) References Cited

U.S. PATENT DOCUMENTS

| | | | |
|---|---|---|---|
| 4,906,137 | A | 3/1990 | Maloberti et al. |
| 6,030,145 | A | 2/2000 | Stewart et al. |
| 6,146,052 | A | 11/2000 | Jacobsen et al. |
| 6,276,874 | B1 * | 8/2001 | Nørholmen ........... E21B 43/013 405/169 |
| 7,241,075 | B2 | 7/2007 | Ottesen et al. |
| 2004/0028477 | A1 | 2/2004 | Kelm et al. |
| 2004/0156684 | A1 | 8/2004 | Pionetti |
| 2005/0196243 | A1 | 9/2005 | Pollock et al. |
| 2007/0081862 | A1 | 4/2007 | Wolbers et al. |
| 2009/0279957 | A1 * | 11/2009 | Hill ...................... F16L 11/133 405/224.2 |
| 2011/0155383 | A1 | 6/2011 | Christiansen et al. |
| 2015/0260148 | A1 * | 9/2015 | Dehlsen ................ F03B 17/061 416/244 B |
| 2016/0258553 | A1 | 9/2016 | Zhang et al. |
| 2017/0183064 | A1 | 6/2017 | Haumonte et al. |

FOREIGN PATENT DOCUMENTS

| | | |
|---|---|---|
| GB | 2024766 A | 1/1980 |
| GB | 2044381 A | 10/1980 |
| GB | 2527845 A | 1/2016 |
| JP | S50-21694 U | 3/1975 |
| JP | H09301267 A | 11/1997 |
| JP | 2012-518983 A | 8/2012 |
| JP | 2019-166885 A | 10/2019 |
| JP | 2019-193446 A | 10/2019 |

OTHER PUBLICATIONS

International Search Report and Written Opinion for application No. PCT/GB2020/053207, dated Mar. 25, 2021.

* cited by examiner

CONDUIT ANCHOR

FIELD OF THE INVENTION

The present invention relates to a conduit anchor. More particularly, the present invention relates to a conduit anchor which incorporates a conduit guide to protect a conduit against over bending.

BACKGROUND OF THE INVENTION

Offshore operations often require electrical conduits or cables for communication purposes to transfer data between the seabed (or freshwater equivalent) and a vessel floating on the surface. Alternatively, a conduit such as a flow line to transport liquid or gas from the seabed to the surface may be required in oil and gas operations. In general, such conduits (often referred to as "risers") are connected to a vessel or platform floating on the surface of the sea and are anchored to the seabed to prevent them from any unwanted movement on the seabed.

The floating vessel or platform is usually anchored to the seabed. However, the vessel may still move due to waves, wind and currents etc. Any conduit (such as an electrical conduit or cables or a tubular or the like) in communication with the seabed and the vessel are normally anchored with a certain amount of slack in the dynamic portion of the conduit extending through the water column, to ensure that the conduit will not break if the vessel moves within its limits of its anchors. The dynamic conduit portion desirably extends to a fixed or static portion of conduit anchored to the seabed.

Due to movement of the vessel, any such dynamic conduits can experience high dynamic loads and are often subject to failure. One common failure mode is caused by over bending of the conduit, i.e. beyond a conduit's minimum bend radius. A common location for over bending to occur is at or near where the dynamic conduit portion extends from the anchor.

Over bending is of particular concern in connection with floating marine energy applications, due to the comparatively large movements and excursions of the floating vessel. A dynamic conduit must therefore be capable of leading away from an anchoring point at the seabed at a large range of angles and to be resistant to over bending.

Conventional strategies to prevent over bending include the uses of reinforcing sheaths, or an excess length of dynamic conduit. Accurate orientation of the dynamic conduit portion in relation to the static conduit portion may also reduce the likelihood of over bending damage. However, these methods can be costly or technically problematic to implement, and over bending damage may still occur.

Accordingly, there remains a need to improve dynamic conduit bend protection in subsea applications.

SUMMARY OF THE INVENTION

According to a first aspect of the present invention, there is provided a conduit anchor comprising:
a base section; and
a conduit guide extending from the base section;
wherein the base section comprises a conduit attachment for securing a static conduit portion to the base section;
wherein the conduit anchor defines a dynamic conduit pathway range, available in use to a dynamic conduit portion extending distally from the conduit attachment via the conduit guide; and
wherein the conduit guide comprises a convex bend protecting surface region oriented towards the dynamic conduit pathway range and oriented distally from the conduit attachment; and the convex bend protecting surface region extending at least partially around the dynamic conduit pathway range.

In use, a conduit extending along the seabed is attached to the anchor's conduit attachment. A static conduit portion extends proximally from the conduit attachment (normally resting on the seabed) and the dynamic conduit portion extends along the dynamic conduit pathway range in generally the opposite direction, distally from the static conduit portion (and onwards to a vessel or installation on the surface of the body or water).

The dynamic conduit portion extends distally from the conduit attachment along the dynamic conduit pathway range, via the conduit guide. The bend protecting surface region defines at least a part of the dynamic conduit pathway range distally from the conduit attachment.

In use, when the dynamic conduit portion moves (due to movement in the water column and/or of an installation at the surface) it is protected from over bending as it abuts the convex bend protecting surface region and in effect "wraps around" the bend protecting surface region.

The distance along the dynamic conduit pathway range between the conduit attachment and the conduit guide may also be selected so as to avoid over bending in the region immediately distal of the conduit attachment.

A given conduit will have a minimum bend radius; i.e. a maximum curvature that the conduit can tolerate without damage. A minimum bend radius corresponds to the radius of a circle having a circumference with the maximum tolerable curvature. A minimum bend radius may include a safety tolerance and may be manufacturer specified or determined by regulatory requirements.

The radius of curvature of all parts of the convex bend protecting surface region along the dynamic conduit pathway range may therefore be selected to be at or above the minimum bend radius of the dynamic conduit portion to be used with the anchor.

A still further benefit is that the conduit anchor provides for more tolerance to installation accuracy, including the orientation of the anchor, since the dynamic conduit portion can bend back on itself to some degree against the bend protecting surface region without exceeding its maximum tolerable curvature.

Where we refer herein to the dynamic conduit pathway range, we refer to a range of pathways distally away from the conduit attachment within which, in use, a distal part of a dynamic conduit is able to adopt. The dynamic conduit pathway range will extend at least partially around a dynamic conduit axis; which is the notional axis along a perfectly linear conduit extending distally from the conduit attachment.

The bend protecting surface region may extend partially or completely around the dynamic conduit pathway range (thus defining an aperture around the dynamic conduit pathway range through which the dynamic conduit portion extends in use).

For example, in some embodiments, when the conduit anchor rests on the seabed, the dynamic conduit axis extends generally along the seabed. Accordingly, the dynamic conduit pathway range will in such embodiments extend distally from the conduit attachment generally along the seabed, although the range of pathways will diverge from side to side and away from the seabed with distance from the conduit attachment. In such embodiments, the bend protecting surface region may extend over and to each side the dynamic conduit pathway range.

In other embodiments, when the conduit anchor rests on the seabed the dynamic conduit axis extends away from the seabed, for example generally perpendicular thereto (i.e. upwards) and thus the dynamic conduit pathway range also extends generally away from the seabed. The dynamic conduit axis can extend, in use, at other angles from the seabed such as at an acute angle.

In some such embodiments, the bend protecting surface region may extend completely around the dynamic conduit pathway range.

The bend protecting convex surface region may define an aperture around the dynamic conduit pathway range in conjunction with other parts of the anchor, such as the base section, or the seabed.

The bend protecting surface region, and thus the dynamic conduit pathway range, may be symmetric in relation to the dynamic conduit axis.

The convex bend protecting surface region may provide bend protection to a dynamic conduit portion extending along the dynamic conduit pathway range through at least about 90 degrees, or at least about 180 degrees.

The convex bend protecting surface region may provide bend protection to a dynamic conduit portion extending along the dynamic conduit pathway range through between around 45-270 degrees, or between around 45-200 degrees, or around 60-180 degrees, or around 90-270 degrees; depending on the requirements of a particular application.

That is to say, in a cross section taken along the dynamic conduit axis, the or each bend protecting surface may comprise an arc (e.g. a circular, elliptical or parabolic arc or combination thereof) or curve which extends through at least 90 degrees, or at least 180 degrees; or any other range of angles, depending on the requirements of a particular application.

The convex bend protecting surface region may comprise a single convex bend protecting surface (i.e. without discontinuities) or more than one surface.

The bend protecting surface region may be defined by a framework, such as a framework of bars or tubes.

The convex bend protecting surface region may comprise more than one convex bend protecting surface section. A bend protecting surface section may be a generally contiguous surface, or may be defined by a framework.

In some embodiments, the concave bend protecting surface region forms part of the shell or outer surface of the conduit guide, as disclosed in further detail below.

A said bend protecting surface section may have a different curvature from another said bend protecting surface section, however in some embodiments the curvature of each bend protecting convex surface section is the same.

The curvature of the bend protecting surface region, or of a said bend protecting surface section thereof, in cross section along the dynamic conduit axis may vary around the dynamic conduit axis. For example, as disclosed in further detail below, the conduit guide may comprise sections made from lengths of a tubular disposed around the dynamic conduit pathway range, oriented normal to the dynamic conduit axis. With distance from the dynamic conduit axis, in cross section along the dynamic conduit axis the degree of ellipsis will therefore necessarily increase.

Whilst a variety of curvatures may be used (for example part elliptical, parabolic or the like), the or each said convex bend protecting surface section may conveniently have a substantially part-circular cross section.

A part-circular cross section can be conveniently manufactured from a cylindrical component, such as a pipe or tubular.

The bend protecting surface region may comprise two, three, four or more surface sections having a part-circular cross section. The conduit guide may for example be constructed from two, three, four or more lengths of a tubular joined end to end around the dynamic conduit pathway range.

In some embodiments, the bend protecting surface region comprises three part-cylindrical surface sections, around three sides of the dynamic conduit pathway range. A fourth side may be defined by the base section, the seabed in use, or may be open.

In some embodiments, the bend protecting surface region comprises four part-cylindrical surface sections, defining an aperture having generally square or rectangular symmetry around the dynamic conduit pathway range.

Other geometries are also possible, such as triangular, polygonal or the like.

The convex bend protecting surface region may comprise a part-toroidal surface section. The part toroidal surface section may be co-axial with the dynamic conduit axis, and thus have a part-circular cross section along the dynamic conduit axis.

The part-toroidal surface section may extend partially around the dynamic conduit pathway range, or completely around the dynamic conduit pathway range.

The conduit guide may comprise a generally toroidal structure.

The convex bend protecting surface region may comprise a surface section defining a partial internal surface of a concave cone; i.e. "trumpet-shaped". The partial internal surface may be of a circular base concave cone, or an elliptical or polygonal base convex cone.

The concave bend protecting surface region may supported by a structural frame, which may be internal to the conduit guide.

It will be understood that the conduit guide may comprise surface regions other than the convex bend protecting surface regions. The bend protecting surface region may extend to surface regions oriented proximally in relation to the dynamic conduit pathway range, and which accordingly do not provide bend protection to a dynamic conduit in use. For example, a tubular member may define a bend protecting surface region around only a part of its circumference.

The anchor may be adapted to be ballasted.

The base section may comprise a location suitable for resting or securing ballast weights to the anchor. The at least a part of the base section may be of hollow construction, and be adapted to be filled with a ballasting material.

The conduit guide may, at least in part, function to ballast the anchor. For example, the conduit guide may be of hollow construction, and be adapted to be filled with a ballasting material. The conduit guide may be machined or cast from a block of a ballasting material, such as a metal block.

The anchor (for example the base section) may further comprise a fluke, for securing the anchor to the seabed.

Alternatively, or in addition, screws, pilings or the like may be used to secure the anchor to the seabed.

The conduit anchor may define a static conduit pathway range. The static conduit pathway range may comprise one or more features as discussed in relation to the dynamic conduit pathway range, extending proximally from the conduit attachment, which may assist in preventing static conduit damage during installation.

The conduit attachment may include clamps, straps or the like for securing a conduit to the base section. The conduit attachment may at least in part define a static conduit pathway range.

The conduit attachment may include means to join a conduit, such as separate dynamic and static conduits.

The conduit attachment may comprise a splicing box, for joining electrical cables, optical fibre or the like. The conduit attachment may comprise apparatus for coupling tubulars together, such as are well known in the art.

The conduit attachment may comprise a proximal end for attachment to a static conduit, and a distal end for attachment to a dynamic conduit. Each may comprise apparatus suitable for joining to a respective conduit.

The proximal and distal ends of the conduit attachment may be co-axial (for example aligned with the dynamic conduit axis). The proximal and distal ends of the conduit attachment may be at an angle to one another, for example perpendicular.

The conduit attachment may comprise an intermediate conduit portion extending between the proximal and distal ends thereof. For example, the intermediate portion may comprise a length of tubular, adapted to be attached to a dynamic tubular at the distal end, and a static tubular at the proximal end. The intermediate portion may comprise a length cable and/or fibre, adapted to be coupled to respective dynamic and static cables/fibres at each end.

In embodiments wherein the conduit attachment includes means to join a dynamic conduit to a static conduit (directly, for example where the conduit attachment comprises a splicing box, or indirectly, for example wherein the conduit attachment is adapted to be attached at its distal end to a dynamic conduit), the conduit attachment may comprise a strain relief apparatus adapted to relive tensile strain on the attached dynamic conduit.

In some embodiments, the dynamic conduit may include an armoured layer (such as are known for example for electrical cables or optical fibre). The conduit attachment may be configured to attach to, and receive strain transmitted via, the armoured layer. For example, an armoured layer at or near a proximal end of a dynamic conduit may be splayed to provide a flanged portion to be clamped against the distal end of the conduit attachment or to a corresponding flanged portion of a static cable.

In alternative embodiments, a dynamic conduit in the form of a tubular riser may comprise a flange portion (e.g. a flange) at its proximal end.

Accordingly, the strain relief apparatus may comprise a clamping apparatus for clamping the or each flange arrangement thereto or therebetween.

Strain relief apparatus may better transmit tensile strain that might otherwise act to detach the dynamic conduit.

The conduit attachment may comprise a bend stiffener, extending from the distal and in some embodiments proximal end thereof, for providing additional resistance to bending of a conduit extending through or secured to the bend stiffener.

A bend stiffener may be a sheath or covering for a conduit portion (for example of a braided or an elastomeric material), to resist bending. A bend stiffener may advantageously resist over bending of a conduit portion for example due to compression of the conduit.

Whilst a bend stiffener may be present, by virtue of its proximity to the bend protecting surface region, the present invention reduces the potential bending strain such a bend stiffener is required to withstand, in comparison to those required between static and dynamic cable portions of conventional installations. As such, the bend stiffener may be made smaller, lighter and at lower cost.

The bend stiffener may extend along the dynamic conduit pathway range from the conduit attachment to and, in some embodiments at least partially through the conduit guide.

The conduit anchor may comprise a fixing, for attaching a strain relief line. The conduit anchor may comprise a strain relief line, coupled at one end to the fixing. The strain line may be provided at its other end with apparatus, such as a clamp or collar, for securing to a dynamic conduit portion.

A strain relief line may, in use, be secured at one end to the anchor and at the other end to a conduit fixing point on or around the dynamic conduit portion distally of the conduit anchor.

The length of the strain relief line limits or prevents the dynamic conduit becoming tensioned between the conduit fixing point and the conduit attachment, before the strain relief line itself is placed in tension. Thus, the strain relief line prevents undue forces being applied directly to the conduit attachment. This is of particular benefit where the conduit attachment comprises means to connect conduits as disclosed herein. This means of strain relief may be use in addition to, or in the alternative to, the strain relief apparatus discussed above.

The strain relief line may also assist in directing the curvature of the dynamic cable portion distally away from the anchor and upwards into the water column, in use.

The fixing may be at any part of the cable anchor, but is conveniently on the base section.

The conduit anchor may be of any suitable construction. For example the base may be constructed from girders, tubulars, bars or beams, etc., The base section may be adapted to provide a stable, and in some embodiments generally flat, platform on the seabed. The base section may for example comprise one or more elongate beams, wherein the conduit guide and conduit attachment are mounted thereon.

The conduit guide may be attached directly to the base or spaced apart therefrom by a supporting framework.

The conduit guide may be of unitary construction or itself constructed from a framework of beams, bars, tubulars or the like.

One or more portions of the conduit anchor (such as at least a part of the conduit guide and/or the base section) may be of hollow construction, for receiving ballasting material as disclosed herein.

According to a second aspect of the invention, there is provided an offshore system comprising:
- an installation on the surface of a body of water;
- a conduit anchor according to the first aspect of the invention; and
- a conduit; the conduit comprising a dynamic conduit portion and a static conduit portion;
- wherein the conduit is attached to the conduit attachment of the conduit anchor, wherein the static conduit portion extends from proximal of the conduit attachment to the conduit attachment and the dynamic conduit portion extends distally from the conduit attachment along the dynamic conduit pathway range, via the conduit guide, and through the water column to the surface installation.

The dynamic conduit portion may have a minimum bend radius.

The radius of curvature of all parts of the convex bend protecting surface region along the dynamic conduit pathway range may be at or above the minimum bend radius of the dynamic conduit portion.

The conduit anchor may be located on the seabed. The base section of the conduit anchor may rest on the seabed.

The static conduit portion may extend along the seabed to the conduit anchor.

The dynamic conduit pathway range may extend distally from the conduit attachment initially generally along the seabed (however it will be understood that the range of pathways within the dynamic conduit pathway range will increase with distance distally of the conduit attachment).

The dynamic conduit pathway range may extend distally from the conduit attachment initially generally away from the seabed, for example generally upwards (substantially vertically, when the anchor is horizontal).

The conduit attachment may comprise strain relief apparatus, such as a clamping apparatus. The conduit may comprise a dynamic conduit and a static conduit coupled together at the conduit attachment, or each coupled to the conduit attachment as disclosed herein.

The dynamic conduit (and optionally also the static conduit) may comprise a flange portion (such as a splayed portion of an armoured layer). The flange portion or portions may be clamped to or between the clamping apparatus.

The installation on the surface of the body of water may comprise a floating vessel. In some embodiments, the installation may comprise a static platform, such as an oil rig, or a wind or tidal turbine fixed to the seabed.

The floating vessel may be anchored to the seabed, via at least one anchoring cable (by which we include braided cables, mooring chains or the like).

The anchoring cables ensure the vessel is held in a generally fixed location on the water surface, but will necessarily allow for some movement of the vessel. The conduit anchor is adapted to prevent over bending of the dynamic cable portion as a consequence of movement of the vessel on the water surface.

The vessel may be an offshore production vessel, such as a floating water power current generator.

According to a third aspect of the present invention, there is provided a method for deploying a conduit anchor according to the first aspect from an installation on the surface of a body of water, the method comprising;

attaching a conduit to the conduit attachment; and
lowering the conduit anchor to the seabed, whereby when the conduit anchor is resting on the seabed a static conduit portion of the conduit extends from proximal of the conduit attachment to the conduit attachment and the dynamic conduit portion extends distally from the conduit attachment along the dynamic conduit pathway range, via the conduit guide, and through the water column to the surface installation.

The method may comprise connecting a dynamic conduit to the conduit attachment.

Attaching the dynamic conduit to the attachment may comprise passing an end of the dynamic conduit, via the conduit guide, to the conduit attachment.

The method may comprise passing the end of the dynamic conduit through an aperture defined by the bend protecting surface region of the conduit guide.

The method may comprise applying a bend stiffener to the cable, in particular the dynamic cable.

The method may comprise connecting a static conduit to the conduit attachment.

It will be understood that connection of a static and dynamic conduit thereby provides the said conduit having a dynamic conduit portion and a static conduit portion.

The connection of the dynamic conduit and static conduit may be conducted at the installation on the surface of the body of water; and before the conduit anchor is lowered to the seabed. One or both connections may alternatively be established on the seabed, after the anchor has been lowered.

The method may comprise providing tensile strain relief to the dynamic cable portion. The method may for example comprise connecting a strain relief line between the conduit anchor and the dynamic cable portion distally thereof.

The conduit attachment may comprise a strain relief apparatus, such as a clamping apparatus, and the method may comprise attaching the strain relief apparatus to a flange portion of said dynamic conduit. The method may comprise forming a flange portion of the dynamic conduit, for example by splaying a portion of an armoured layer of the dynamic conduit at or near the proximal end thereof.

Where connection to the static cable is established at the installation, the method may comprise retrieving an end of the static cable from the seabed.

The static cable may for example be a spur of a larger conduit network, such as a power distribution network, or a fluid distribution pipeline.

The method may comprise ballasting the conduit anchor. Ballasting may be conducted on the seabed, for example by placing one or more ballasting weights on the body section thereof (which may be lowered to the seabed from the installation).

Ballasting the anchor may alternatively, or in addition, be conducted at the installation. For example, in some embodiments at least a portion of the conduit guide and/or the base section may be of hollow construction, and the method may comprise filling the or each hollow portion with a ballasting material, such as sand, or particulate metal (e.g. lead or steel nodules or waste fragments, or the like).

The method may comprise pinning, piling or bolting the anchor to the seabed.

The method may comprise lowering the anchor to the seabed and subsequently repositioning or re-aligning the anchor on the seabed.

The present invention is not limited to marine applications and is also of utility in any body of water, including lakes, rivers estuaries and the like. Accordingly references herein to a "seabed" should be considered to apply to the bed of any such body of water and are thus interchangeable with "river bed", "lake bed" etc.

Terms such as "above", "below" and "to the side of" or "laterally" refer to orientations when the conduit anchor is at rest on a level seabed, and should not be construed so as to exclude such features in relation to other orientations of the anchor.

Reference herein to "proximal" and "distal" and similar terms are made from the frame of reference along a static conduit portion towards the cable attachment of the conduit anchor. That is to say that a static conduit portion of the conduit attached to the conduit anchor extends proximally from the conduit anchor, and a dynamic conduit portion of the conduit extends distally from the conduit anchor.

With reference to conduits or conduit portions (including cables, tubulars or optical fibres etc.), the terms "static" and "dynamic" are descriptive of their characteristics when attached to a conduit anchor on the seabed.

It is intended that optional features disclosed herein in relation to on aspect of the invention correspond to optional features of any other aspect of the invention. Disclosures herein relating to the function, construction or use of features of apparatus should accordingly be understood to correspond to steps of a method as disclosed herein, and disclosures herein relating to a method should be understood to also encompass apparatus having such features required to carry out such a method.

BRIEF DESCRIPTION OF THE DRAWINGS

Example embodiments now be described with reference to the following Figures in which.

DETAILED DESCRIPTION

Figure 1:
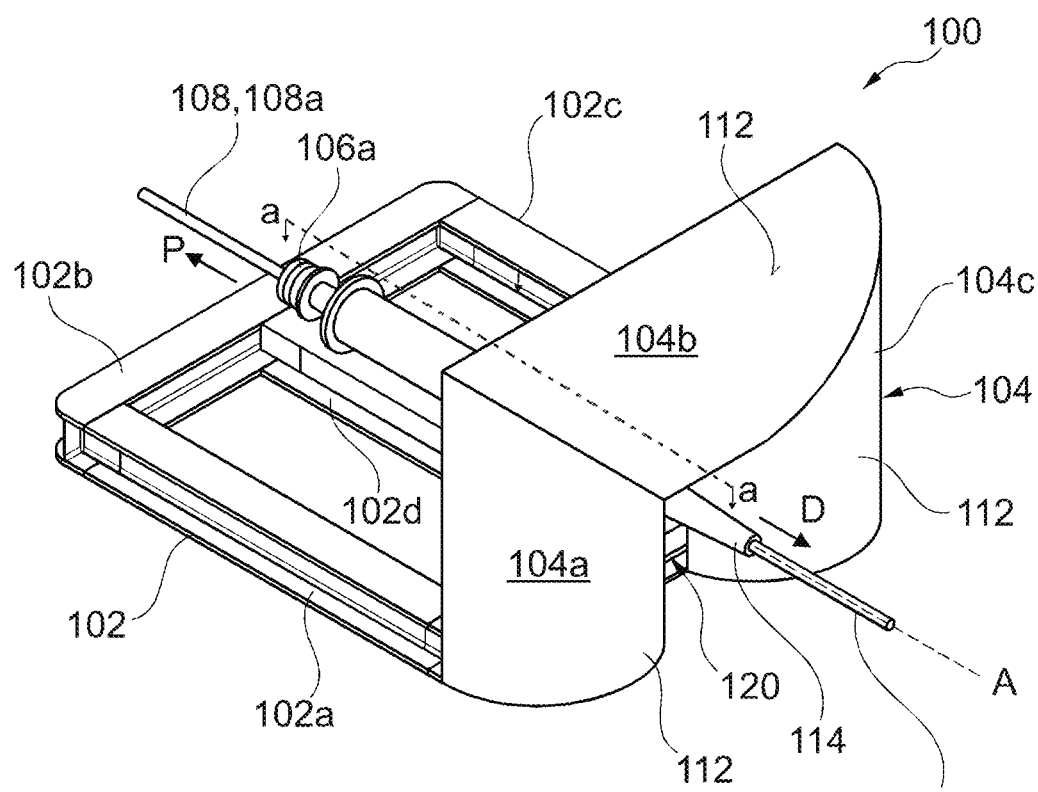
FIG. 1 is a perspective view of an embodiment of a conduit anchor.
Figure 2:
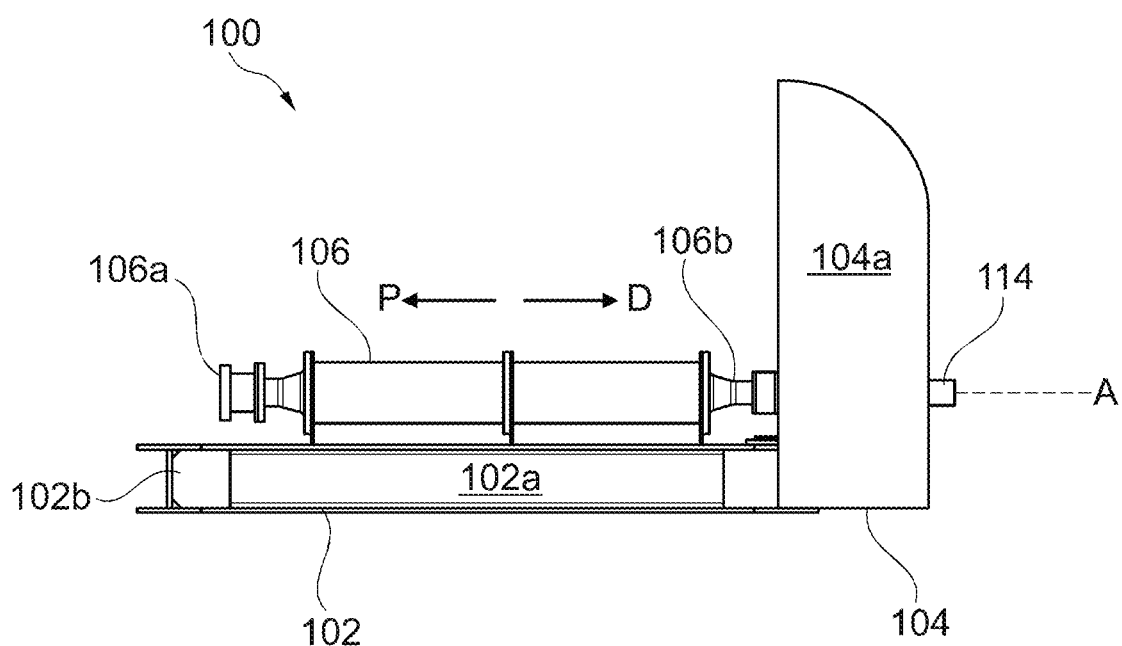
FIG. 2 is a side view of the conduit anchor in FIG. 1.
Figure 3:
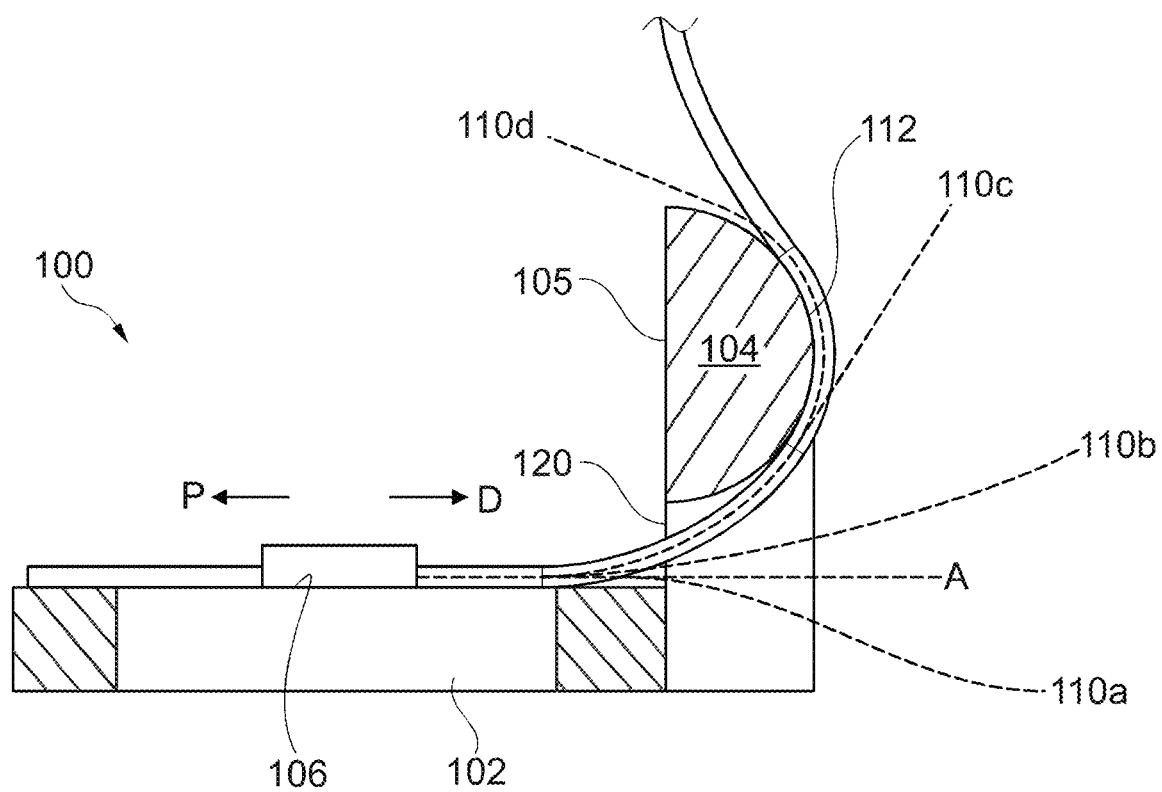
FIG. 3 is a cross sectional side view through line a of the conduit anchor in FIGS. 2 and 3 showing a static conduit portion and a dynamic conduit portion extending along the dynamic conduit pathway range defined by the conduit anchor.

FIGS. 1, 2 and 3 show a conduit anchor 100. The conduit anchor 100 has a base section 102 and a conduit guide 104 extending from the base section. The base section 102 comprises a conduit attachment 106 for securing a conduit 108 to the base section 102. The conduit 108 includes a static conduit portion 108a and a dynamic conduit portion 108b.

In the example shown the dynamic and static portions are separate dynamic and static conduits attached to respective ends of the conduit attachment (discussed in further detail below), but in alternative embodiments the conduit 108 is contiguous.

The dynamic conduit portion 108b extends in use distally from the conduit attachment 106 through the water column to a vessel on the water surface, while the static conduit portion 108a extends proximally along the seabed, typically to an export pipeline, or power distribution network or the like. The proximal and distal orientations in relation to the conduit attachment 106 are illustrated by the arrows marked P and D, respectively in the Figures.

The cable anchor 100 defines a dynamic conduit pathway range which extends distally from the conduit attachment 106 via the conduit guide 104, which incorporates all of the pathways along which the dynamic conduit portion 108b can follow, as illustrated by dotted pathways 110a-d in FIG. 3. It will be understood that the dynamic conduit pathway range diverges also laterally, in the embodiment shown.

Also illustrated in FIG. 3 is the notional dynamic conduit axis A, extending linearly from the distal end of the conduit attachment 106, generally along the seabed in normal use. The dynamic conduit pathway range extends and diverges symmetrically around the axis A laterally.

The conduit guide includes a convex bend protecting surface region 112 oriented towards the dynamic conduit pathway range and which is also oriented distally in relation to the conduit attachment 106. The proximal face 105 of the conduit guide 104 does not for example form part of the bend protecting surface region 112, since it is oriented proximally in relation to the conduit attachment.

The convex bend protecting surface region 112 has a radius of curvature which, in the embodiment shown, slightly exceeds minimum bend radius of the conduit 108, and thereby prevents the dynamic conduit portion 108b from having a curvature below its minimum bend radius.

The conduit guide 104 is constructed from three tubular bend protecting surface structures 104a, 104b and 104c connected end-to-end orthogonally. The tubular structures each comprise a part-cylindrical surface, having part-circular cross sections, providing bend protection to the dynamic conduit portion 108b through around 180 degrees of curvature.

In other embodiments, the bend protecting surface region may include other curvatures, as disclosed herein.

The conduit guide 104, and more particularly the bend protecting surface region 112 extends in use over and to each side of the dynamic conduit pathway range. The dynamic conduit pathway range is bounded around the remaining part of its circumference in part by the base section 102 and the seabed. The base section 102 and convex bend protecting surface region 112 together define an aperture 120 through which the dynamic conduit portion 108b extends in use.

The conduit attachment 106 includes in this embodiment a "splicing box" having at its proximal end a conduit connector 106a for connection to the static conduit portion 108a, and at its distal end a conduit connector 106b for connection to the dynamic conduit portion 108b.

The embodiment shown is for connection of electrical distribution cables and the conduit attachment also provides an intermediate conduit portion extending between the connectors 106a and 106b.

Extending from the distal end of the conduit attachment 106 is a bend stiffener 114, in the form of an elastomeric sheath. In use the dynamic conduit portion 108b of the conduit 108 is introduced through the bend stiffener, as shown in FIG. 1. The bend stiffener 114 extends partially into the region of the dynamic cable pathway range defined by the bend protecting surface region 112. Although the bend stiffener 114 is shown extending along the axis A in the figures, in use it will bend together with the dynamic conduit portion 108b within the bounds of the dynamic conduit pathway range.

In alternative embodiments, the bend stiffener is applied directly to a dynamic conduit portion prior to connection to the anchor, or may be omitted entirely.

The base section 102 is constructed from beams 102a, 102b, 102c and 102d and provides a stable platform to rest on a sea bed in use. In addition, the beams around the periphery 102a-c may be weighed down or ballasted after the anchor has been deployed, by ballast weights such as concrete blocks or the like.

In the embodiment shown the conduit guide 104 is of hollow construction and may also be filled with a ballasting material. In alternative embodiments (not shown) the conduit guide may be cast of machined as a solid block, or formed from an open framework. The construction and ballasting of the conduit anchor can be varied according to the intended means of deployment. In some circumstances for example it may be preferable for the anchor not to be ballasted at the surface, and ballasted or otherwise pinned or bolted to the seabed. In other circumstances, such as in deeper water where post-deployment access is more difficult, it may be preferable for the anchor to be ballasted at the surface.

To deploy the anchor 100, a static conduit portion 108a is retrieved (e.g. floated) from the seabed and a dynamic conduit portion 108b provided on a surface installation such as a vessel. The portions 108a and 108b of the conduit 108 are connected to the respective ends of the conduit attachment 106. In particular the dynamic conduit portion 108b is introduced through the aperture 120 via the conduit guide 104, in this embodiment into the cable stiffener 114.

The hollow portion of the conduit guide (not shown) is then filled with a ballasting material such as metallic pellets and the anchor deployed to the seabed.

The bend protecting surface regions provide a greater degree of tolerance to the final orientation of the anchor than would otherwise be possible.

Figure 4:
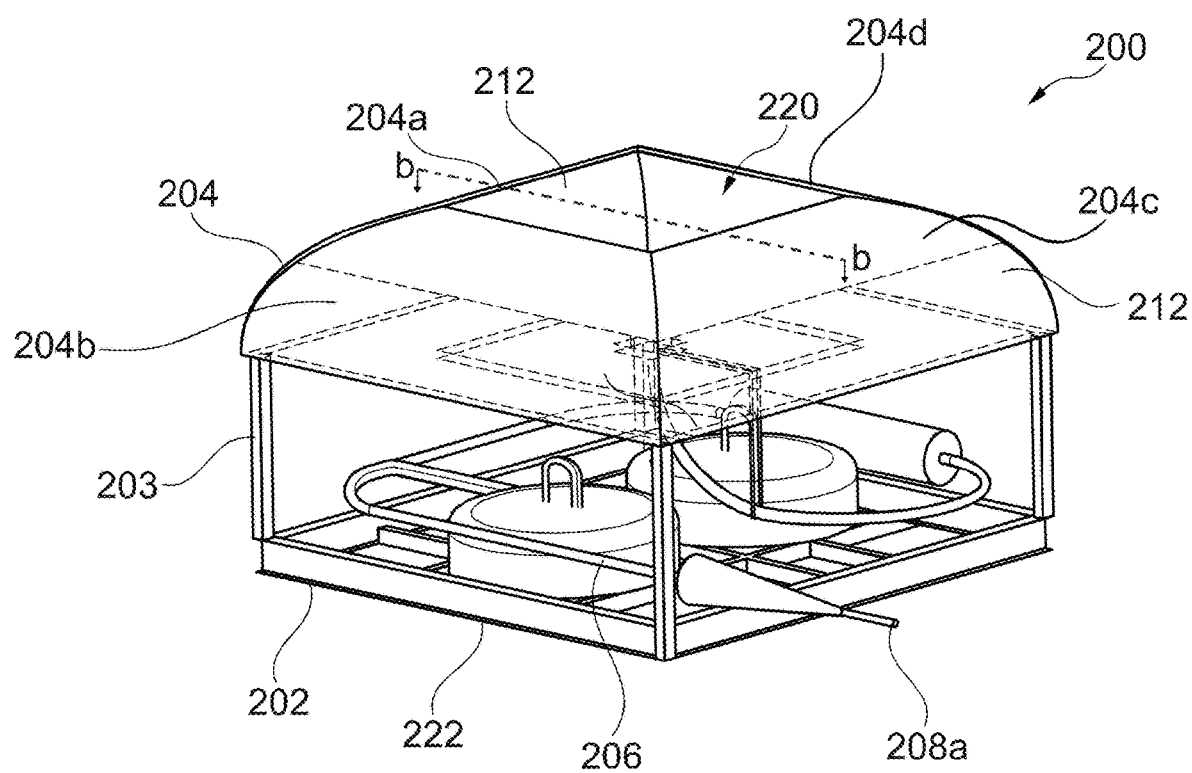
FIG. 4 is a perspective view of another embodiment of a conduit anchor with ballast weights attached.
Figure 5:
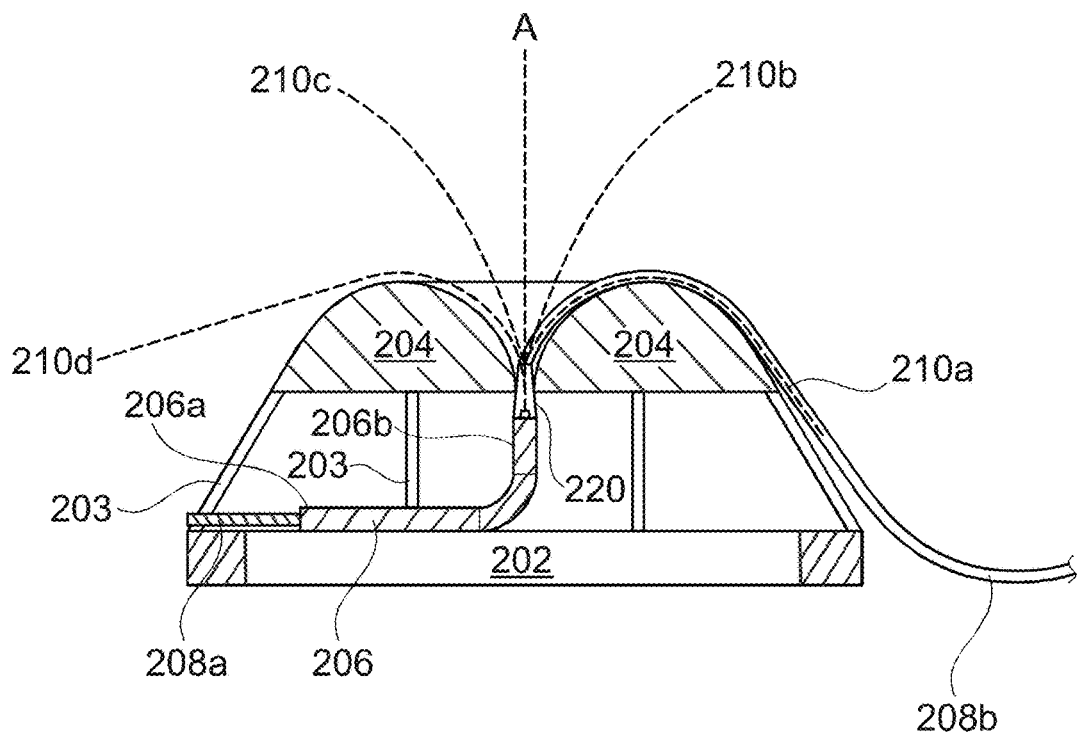
FIG. 5 is a cross sectional side view of the conduit anchor of FIG. 4 through line b.

FIGS. 4 and 5 show another example of a conduit anchor 200. Features in common with the conduit anchor 100 are provided with like reference numerals, incremented by 100.

The anchor 200 includes a base section 202 and mounted thereto by a framework 203 is a conduit guide 204.

The conduit guide is constructed from four tubular bend protecting surface structures 204*a, b, c* and *d* connected end-to-end orthogonally to define an aperture 220 through the conduit guide 204. Accordingly, the convex bend protecting surface region 212 extends completely around the dynamic cable pathway range (the axis A of which is marked in the figure).

The conduit attachment in this instance includes a 90 degree bend, such that the proximal cable 208*a* extends to the proximal end 206*a* along the seabed in use, and the distal cable portion exits the distal end 206*b* generally vertically through the aperture 220, away from the seabed. Consequently, the dynamic cable pathway range extends initially generally vertically distally from the conduit attachment 206. This orientation, together with the convex bend protecting surface region 212 extending completely around the dynamic conduit pathway range provides for the dynamic cable pathway range to diverge in 360 degrees from the distal end 206*b* of the attachment 206, as illustrated by the example pathways 210*a-d* shown in FIG. 5.

The degree of bend protection also extends for between 90 and 180 degrees (i.e. away from the axis A) to permit the dynamic conduit portion 208*b* to bend back on itself and rest on the seabed, if required.

In alternative embodiments (not shown) the cable guide 104 may be open-sided (e.g. generally U-shaped) and provide bend protection only around a part of the dynamic conduit pathway range. Such an embodiment may provide for more convenient attachment of a conduit in some circumstances, for example when attachment is conducted at the seabed.

Also visible in FIG. 4 are ballast weights 222 on the base section 202. The ballast weights may be added at the water surface before deployment, or on the seabed.

Figure 6A:
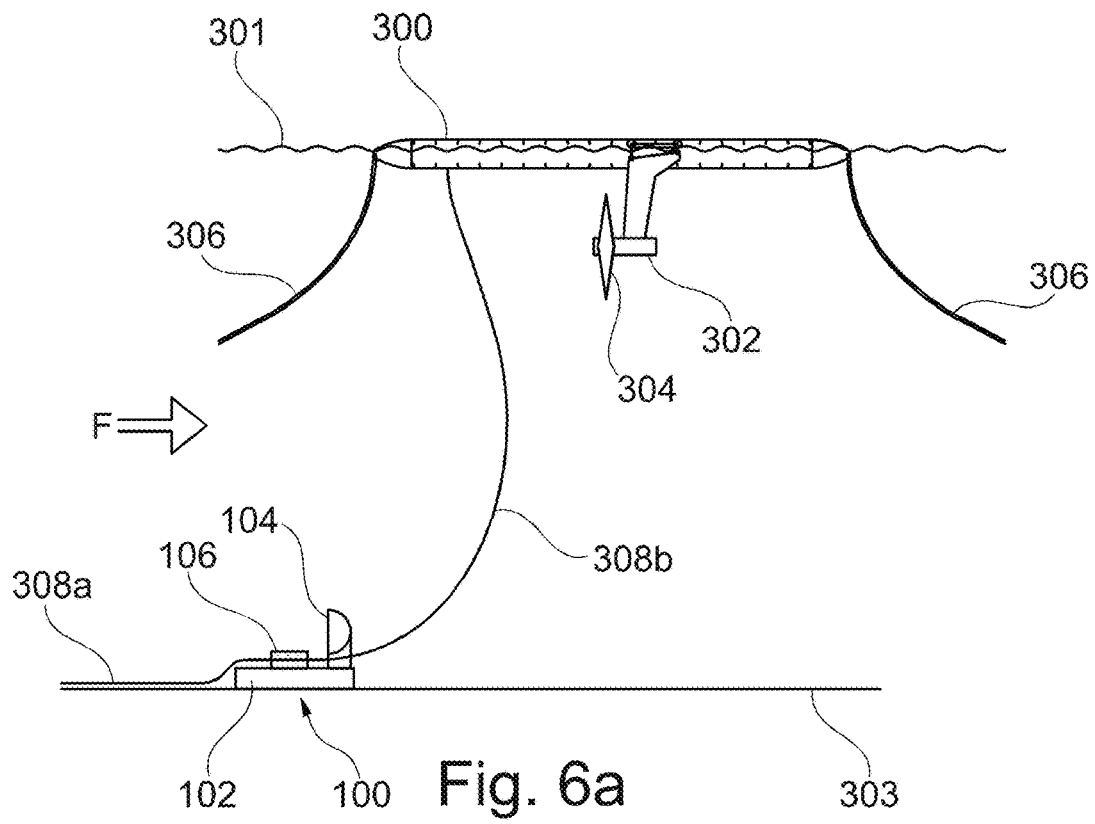
FIGS. 6a and 6b show an offshore system comprising a conduit anchor.
Figure 6B:
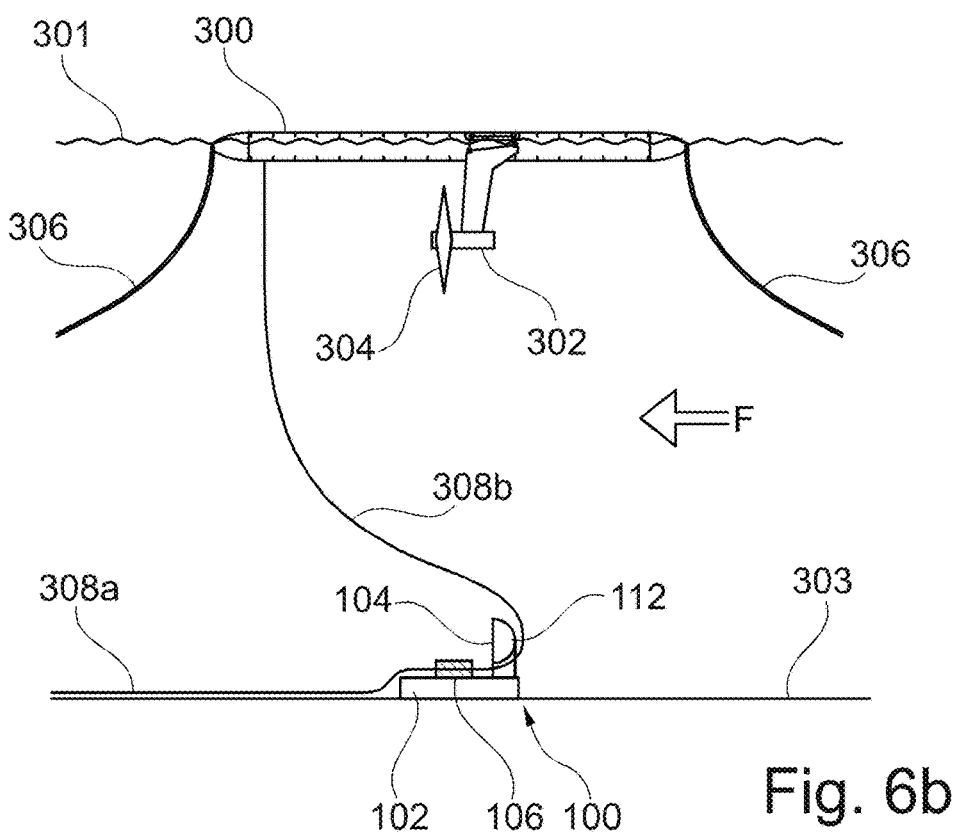

FIGS. 6*a* and 6*b* schematically illustrate the utility of the conduit anchor in accordance with the invention. FIGS. 6*a* and 6*b* show an offshore system including an installation of the surface 301 of a body of water, in the example shown a floating tidal generator (water current power generator) 300, comprising nacelles 302 and rotors 304 for capturing energy from flowing water.

The generator 300 is anchored via anchor lines 306 in a conventional manner. In order to accommodate tidal variations, weather conditions (rough sea, currents etc) and the nominal pitch and roll experienced due to loads transferred via the rotors 304, the anchor lines must be provided with a degree of slack, in turn permitting some movement of the vessel 300 in relation to the seabed.

The generator 300 is connected to an electrical distribution system via a static electrical cable 308*a* on the seabed 303. The static cable 308*a* is a spur with onward connection to a subsea cable network (not shown). The static cable 308*a* is connected to the conduit attachment 106 of the anchor 100 as described above.

A dynamic cable 308*b* extends from the generator 300 through the water column to the anchor 100. The dynamic cable is connected to the distal end of the conduit attachment 106 as described above, and extends distally therefrom along the dynamic cable pathway range via the conduit guide 104.

As the generator 300 moves on the surface (for example between the flow conditions F to the right as in FIG. 6*a* and to the left as in FIG. 6*b*), the angle through which the dynamic cable 308*b* is prone to bend will vary. The tidal and other environmental conditions experienced by the generator 300 may also be experienced to some degree by the dynamic cable 308*b* extending through the water column, also giving rise to variations in its pathway.

Whilst the anchor may be positioned relatively optimally for certain conditions, such as the high flow conditions shown in FIG. 6*a* (in which the dynamic cable is urged to a pathway in which it extends distally from the anchor 100 at a relatively shallow angle), the position may be less optimised at other times. For example, as shown in FIG. 6*b*, the generator 300 has moved further over the anchor 100 and the dynamic cable 308*b* is bent back on itself against the cable guide 104. The convex bend protecting surface region 112 in such circumstances prevents over bending, fatigue and potential breakage which might otherwise occur.

Figure 7A:
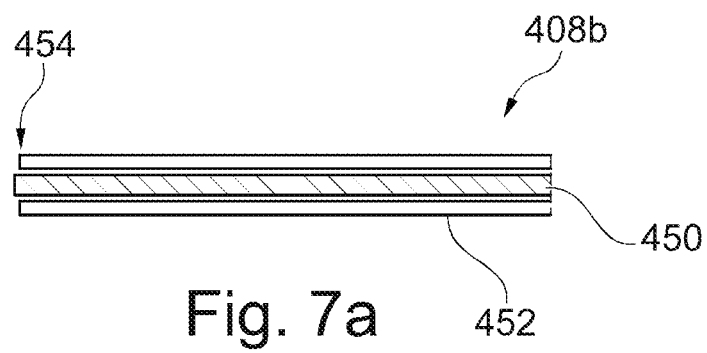
FIGS. 7a to 7c show a strain relief apparatus.
Figure 7B:
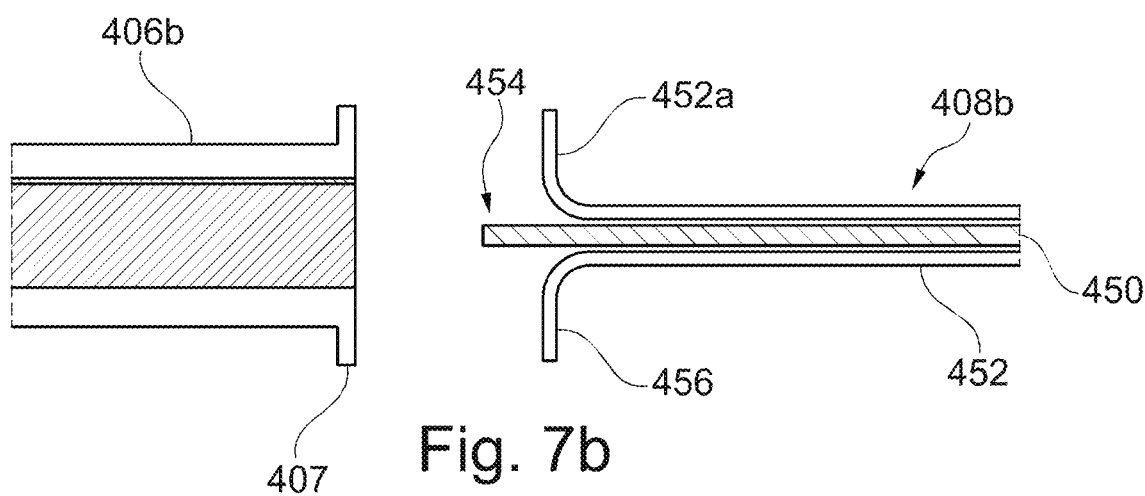
Figure 7C:
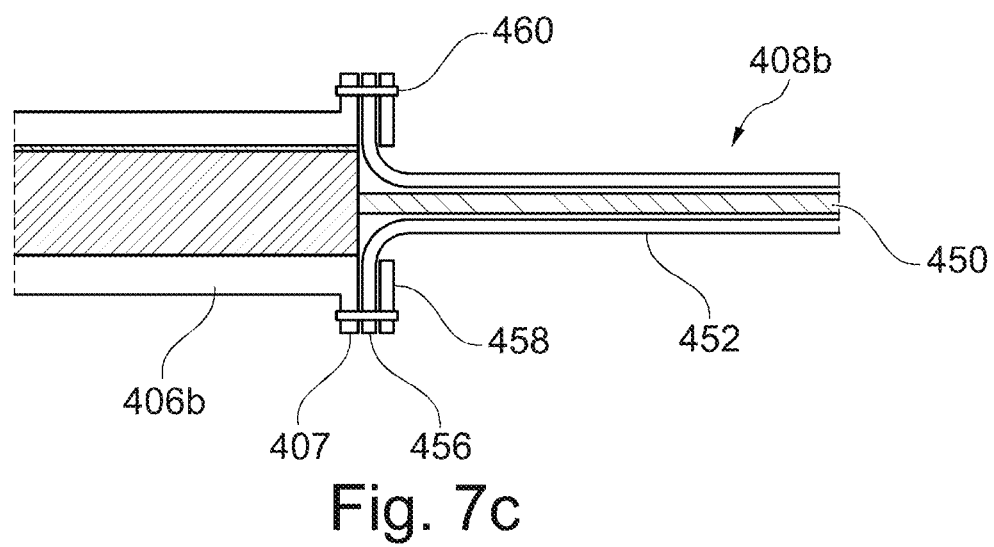

Additional tensile strain relief for the dynamic conduit portion may be provided, such as a stain relief line disclosed herein. FIGS. 7*a* to 7*c* illustrate the provision of strain relief via a flange portion of a dynamic conduit.

A dynamic conduit 408*b* may take the form of an armoured cable, armoured optical fibre or the like, having an inner core 450 (such as an electrical cable or cable bundle, optical fibre bundle or the like) and an outer armoured layer 452, typically in the form of one or more helically wound braids.

At the proximal end 454 of the dynamic cable 408*b*, a proximal portion 452*a* of the armoured layer can be outwardly splayed to form a flange portion 456.

The proximal end 454 is then attached to the distal end 406*b* of a conduit attachment, such that the flange portion 456 of the dynamic conduit 408*b* is against a flange 407 at the distal end of the conduit attachment. The flange portion may then be clamped between the flange 407 and a collar 458, by bolts 460 extending through apertures in the flange and collar (not visible in the schematic FIGS. 7*a-7c*); as shown in FIG. 7*c*.

Tension applied to the dynamic conduit 408*b* is thereby transmitted to the conduit attachment via the armoured layer 452, and the strain relief apparatus 407, 456, 458, 460. The inner core 450 is, at least to some degree, isolated from such tensile stress.

Whilst various exemplary embodiments have been disclosed, it shall be understood that variations, modifications and combinations of the valve and methods disclosed herein disclosed herein may be made without departing from the scope of the appended claims.

The invention claimed is:

1. A conduit anchor comprising:
   a base section; and
   a conduit guide extending from the base section,
   wherein the base section comprises a conduit attachment for securing a static conduit or a static portion of a conduit to the base section,
   wherein the conduit anchor defines a dynamic conduit pathway range that includes the range of pathways extending distally away from the conduit attachment that a distal part of a dynamic conduit or a dynamic portion of the conduit can follow,
wherein the dynamic conduit pathway range extends at least partially circumferentially around a dynamic conduit axis,
wherein the dynamic conduit axis is a notional linear axis extending through a distal end of the conduit attachment,
wherein the conduit guide comprises a convex bend protecting surface region,
wherein the convex bend protecting surface region comprises one or more convex bend protecting surfaces, or wherein the convex bend protecting surface region is defined by a framework,
the bend protecting surface region being oriented towards the dynamic conduit pathway range and distally from the conduit attachment, and the convex bend protecting surface region extending at least partially around a periphery of the dynamic conduit pathway range, and
wherein the convex bend protecting surface region thereby defines at least a part of the dynamic conduit pathway range of the distal part of the dynamic conduit or the dynamic portion of the conduit and provides bend protection to the dynamic conduit or the dynamic portion of the conduit extending along the dynamic conduit pathway range through at least about 180 degrees away from the said notional axis.

2. The conduit anchor of claim 1, for use with the dynamic conduit or the dynamic portion of the conduit having a minimum bend radius, and wherein a radius of curvature of all parts of the convex bend protecting surface region along the dynamic conduit pathway range is at or above the minimum bend radius of the dynamic conduit or the dynamic portion of the conduit.

3. The conduit anchor of claim 1, wherein when the conduit anchor rests on a seabed, the dynamic conduit axis extends generally away from the seabed.

4. The conduit anchor of claim 3, wherein when the conduit anchor rests on the seabed, the bend protecting surface region extends completely around the periphery of the dynamic conduit pathway range and defines an aperture around the periphery of the dynamic conduit pathway range through which the dynamic conduit or the dynamic portion of the conduit extends in use.

5. The conduit anchor of claim 1, wherein the convex bend protecting surface region comprises more than one convex bend protecting surface section.

6. The conduit anchor of claim 1, wherein each convex bend protecting surface region has a substantially part-circular cross section.

7. The conduit anchor of claim 6, wherein the bend protecting surface region comprises two, three, four or more convex bend protecting surface sections having a part-circular cross section constructed from two, three, four or more lengths of a tubular joined end to end around the periphery of the dynamic conduit pathway range.

8. The conduit anchor of claim 7, wherein when the conduit anchor rests on the seabed, a dynamic conduit pathway range extends distally from the conduit attachment generally away from the seabed, and wherein the bend protecting surface region comprises four part-cylindrical surface sections, defining an aperture having generally square or rectangular symmetry around the periphery of the dynamic conduit pathway range.

9. The conduit anchor of claim 1, wherein the conduit attachment includes means to join separate dynamic and static conduits.

10. The conduit anchor of claim 9, wherein the conduit attachment comprises a proximal end for attachment to a static conduit, and the distal end for attachment to a dynamic conduit.

11. The conduit anchor of claim 9, wherein the conduit attachment further comprises strain relief apparatus.

12. The conduit anchor of claim 1, wherein the conduit attachment comprises a bend stiffener extending from the distal end thereof.

13. An offshore system comprising:
an installation on a surface of a body of water;
a conduit anchor comprising:
a base section; and
a conduit guide extending from the base section,
wherein the base section comprises a conduit attachment for securing a static conduit or a static portion of a conduit to the base section,
wherein the conduit anchor defines a dynamic conduit pathway range, wherein the dynamic conduit pathway range comprises the range of pathways extending distally away from the conduit attachment that a distal part of a dynamic conduit or a dynamic portion of the conduit can follow,
wherein the dynamic conduit pathway range extends at least partially circumferentially around a dynamic conduit axis, wherein the dynamic conduit axis is a notional linear axis extending through a distal end of the conduit attachment,
wherein the conduit guide comprises a convex bend protecting surface region,
wherein the convex bend protecting surface region comprises one or more convex bend protecting surfaces, or wherein the convex bend protecting surface region is defined by a framework,
the end protecting surface region being oriented towards the dynamic conduit pathway range and distally from the conduit attachment and the convex bend protecting surface region extending at least partially around a periphery of the dynamic conduit pathway range, and
wherein the convex bend protecting surface region thereby defines at least a part of the dynamic conduit pathway range of the distal part of the dynamic conduit or the dynamic portion of the conduit and provides bend protection to the dynamic conduit or the dynamic portion of the conduit extending along the dynamic conduit pathway range through at least about 180 degrees away from the said notional axis; and
a conduit comprising the dynamic portion and the static portion,
wherein the conduit is attached to the conduit attachment of the conduit anchor, wherein the static portion of the conduit extends from proximal of the conduit attachment to the conduit attachment and the dynamic portion of the conduit extends distally from the conduit attachment along the dynamic conduit pathway range, via the conduit guide, and to the surface installation.

14. The offshore system of claim 13, wherein the dynamic portion of the conduit comprises a minimum bend radius and a radius of curvature of all parts of the convex bend protecting surface region along the dynamic conduit pathway range is at or above the minimum bend radius of the dynamic conduit portion of the conduit.

15. The offshore system of claim 13, wherein the installation on the surface of the body of water comprises a floating water power current generator.

16. A method for deploying a conduit anchor from an installation on a surface of a body of water, wherein the conduit anchor comprises:
- a base section; and
- a conduit guide extending from the base section,
  - wherein the base section comprises a conduit attachment for securing a static conduit or static portion of a conduit to the base section,
  - wherein the conduit anchor defines a dynamic conduit pathway range, available in use to a dynamic conduit or dynamic portion of the conduit extending distally from the conduit attachment via the conduit guide, and
  - wherein the conduit guide comprises a convex bend protecting surface region oriented towards the dynamic conduit pathway range and distally from the conduit attachment; and the convex bend protecting surface region extending at least partially around the dynamic conduit pathway range, the method comprising:
- attaching a conduit to the conduit attachment, wherein the conduit comprises a static portion and dynamic portion extending from the static portion; and
- lowering the attached conduit anchor to the seabed, whereby when the conduit anchor is resting on the seabed the static portion of the conduit extends from proximal of the conduit attachment to the conduit attachment and the dynamic portion of the conduit extends distally from the conduit attachment along the dynamic conduit pathway range, via the conduit guide, and to the surface installation.

17. The method of claim 16, comprising connecting the dynamic conduit to the conduit attachment by passing an end of the dynamic conduit, via the conduit guide, to the conduit attachment.

18. The method of claim 17, comprising connecting the dynamic conduit and the static conduit on the surface of the body of water; and then lowering the conduit anchor to the seabed.

19. A conduit anchor comprising:
- a base section; and
- a conduit guide extending from the base section,
  - wherein the base section comprises a conduit attachment for securing a static conduit or a static portion of a conduit to the base section,
  - wherein the conduit anchor defines a dynamic conduit pathway range that includes the range of pathways extending distally away from the conduit attachment that a distal part of a dynamic conduit or a dynamic portion of the conduit can follow,
  - wherein the dynamic conduit pathway range extends at least partially circumferentially around a dynamic conduit axis,
  - wherein the dynamic conduit axis is a notional linear axis extending through a distal end of the conduit attachment, and wherein when the conduit anchor rests on a seabed, the dynamic conduit axis extends distally from the conduit attachment generally vertically away from the seabed,
  - wherein the conduit guide comprises a convex bend protecting surface region,
  - wherein the convex bend protecting surface region comprises one or more convex bend protecting surfaces, or wherein the convex bend protecting surface region is defined by a framework,
  - the bend protecting surface region being oriented towards the dynamic conduit pathway range and distally from the conduit attachment, and the convex bend protecting surface region extending at least partially around a periphery of the dynamic conduit pathway range, and
  - wherein the convex bend protecting surface region thereby defines at least a part of the dynamic conduit pathway range of the distal part of the dynamic conduit or the dynamic portion of the conduit and provides bend protection to the dynamic conduit or the dynamic portion of the conduit extending for between 90 and 180 degrees away from the dynamic conduit axis.

20. The conduit anchor of claim 19, for use with a dynamic conduit portion having a minimum bend radius, wherein a radius of curvature of all parts of the convex bend protecting surface region along the dynamic conduit pathway range is at or above the minimum bend radius of the dynamic conduit portion.

* * * * *